C. E. LONGDEN.
Gun-Cleaner.

No. 209,276. Patented Oct. 22, 1878.

Witnesses.

Chas. E. Longden
Inventor
By atty

UNITED STATES PATENT OFFICE.

CHARLES E. LONGDEN, OF NEW HAVEN, CONNECTICUT.

IMPROVEMENT IN GUN-CLEANERS.

Specification forming part of Letters Patent No. 209,276, dated October 22, 1878; application filed September 9, 1878.

*To all whom it may concern:*

Be it known that I, CHAS. E. LONGDEN, of New Haven, in the county of New Haven and State of Connecticut, have invented a new Improvement in Gun-Cleaners; and I do hereby declare the following, when taken in connection with the accompanying drawings and the letters of reference marked thereon, to be a full, clear, and exact description of the same, and which said drawings constitute part of this specification, and represent, in—

Figure 1:
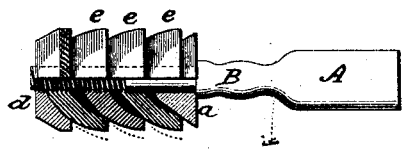
Figure 2:
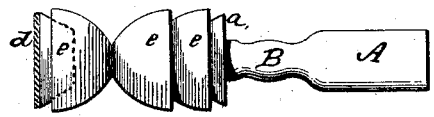

Figure 1, sectional side view; Fig. 2, side view, showing a change in position of some of the parts.

This invention relates to a device for cleaning fire-arms; and consists in the construction of the cleaner, as hereinafter described, and more particularly recited in the claim.

A is the socket, to which the cleaning-rod is attached by screwing into it in the usual manner, or it may be made a permanent part of the rod. From this a spindle, B, extends in axial line, provided with a collar or permanent piece, $a$, of conical shape, and on the extreme end of the spindle a nut, $d$, is applied. Between the collar $a$ and the nut $d$ several cup-shaped disks, $e$, are arranged, the outer conical surface of one entering within and so as to bear upon the edge of the interior of the next, as clearly shown, the disk next the collar $a$ passing onto the collar in like manner as the disks do one upon the other. These disks are made of india-rubber or other elastic material.

By screwing the nut $d$ onto the spindle and against the first disk all the disks are forced together, and, owing to their peculiar shape, whereby the expanding-force is applied radially, and at the thin edge only, they easily expand to perfectly fill the interior of the barrel, the size of the disks in their normal condition being less than the diameter of the barrel. The disks pass easily into the barrel, and in drawing outward all obstruction or dirt is removed.

In some cases it may be desirable to reverse one or more of the disks, as seen in Fig. 2, or to reverse them all. In order to do this the nut $a$ is cup-shaped upon one side and conical upon the other, so as to fit the two conditions, as seen in Figs. 1 and 2.

This applicant is aware that india-rubber cleaners have been made, having annular grooves presenting a sharp edge, having substantially the appearance of the exterior of this improvement; but they have been made solid, and without the capacity or facility of adjustment found in this improvement. No claim is here intended to be made broadly to an elastic or expansible gun-cleaner; but

What is claimed is—

The herein-described gun-cleaner, consisting of the spindle, collar, and nut, combined with a series of cup-shaped elastic disks between said nut and collar, the outer side of one disk fitting into the next, and bearing only at the edge, and so as to apply the expanding-force radially, substantially as described.

CHARLES E. LONGDEN.

Witnesses:
JOHN E. EARLE,
J. H. SHUMWAY.